US012797976B2

(12) United States Patent
Gilchrest et al.

(10) Patent No.: US 12,797,976 B2
(45) **Date of Patent: *Nov. 17, 2026**

(54) TOOL ATTACHMENT FOR CUTTING HEAVY DUTY SUBSTRATE

(71) Applicant: GENERAL TOOLS & INSTRUMENTS COMPANY LLC, Secaucus, NJ (US)

(72) Inventors: Edward Gilchrest, Oxford, CT (US); Matthew Prancuk, Brookfield, CT (US); Andrew Krystinik, Middlefield, CT (US); Matthew Phillips, Litchfield, CT (US)

(73) Assignee: General Tools & Instruments Company LLC, Secaucus, NJ (US)

( * ) Notice: Subject to any disclaimer, the term of this patent is extended or adjusted under 35 U.S.C. 154(b) by 116 days.

This patent is subject to a terminal disclaimer.

(21) Appl. No.: 18/816,423

(22) Filed: Aug. 27, 2024

(65) Prior Publication Data

US 2024/0416438 A1 Dec. 19, 2024

Related U.S. Application Data

(63) Continuation of application No. 17/420,245, filed on Jul. 1, 2021, now Pat. No. 12,076,801.

(51) Int. Cl.
*B23D 17/04* (2006.01)
*B25F 3/00* (2006.01)
(Continued)

(52) U.S. Cl.
CPC ................ *B23D 17/04* (2013.01); *B25F 3/00* (2013.01); *B25F 5/026* (2013.01); *B26B 15/00* (2013.01)

(58) Field of Classification Search
CPC .... B23D 17/04; B23D 29/002; B23D 29/005; B23D 29/02; B25F 3/00; B25F 5/021;
(Continued)

(56) References Cited

U.S. PATENT DOCUMENTS 2,047,483 A 7/1936 McArdle et al.
2,220,871 A 11/1940 Toop
(Continued)

FOREIGN PATENT DOCUMENTS

AU 2020205095 A1 * 7/2021 ............. B23D 17/04
CA 3124522 A1 * 7/2020 ............. B23D 17/04
(Continued)

*Primary Examiner* — Jason Daniel Prone
(74) *Attorney, Agent, or Firm* — Tucker Ellis LLP

(57) ABSTRACT

A cutting tool attachment for a power tool is freely rotatable about an end of the power tool. A fence provides a complementary flat surface area for the cutting tool attachment to rest against a surface of the material to be cut. The fence prevents free rotation of the cutting tool attachment while in use. A handle allows a user to guide the attachment along the surface of the material, while also providing leverage to keep the attachment against the material surface close to the attachment, but at a safe position to reduce the chance of injury. A user can rotate the power tool relative to the cutting attachment to achieve a comfortable position or to help turn the attachment and power tool. The power tool is therefore positionable along a 360 arc of movement relative to the attachment while the attachment is positioned along the surface of a material.

20 Claims, 7 Drawing Sheets

(51) Int. Cl.
*B25F 5/02* (2006.01)
*B26B 15/00* (2006.01)

(58) Field of Classification Search
CPC ... B25F 5/02; B26B 15/00; B26B 7/00; B26B 29/00; B26B 29/06; A61F 15/02
USPC .................................................... 30/228, 500
See application file for complete search history.

(56) References Cited

U.S. PATENT DOCUMENTS

| | | | | |
|---|---|---|---|---|
| 2,244,638 | A | | 6/1941 | Boardman |
| 2,256,779 | A | | 9/1941 | McHenry |
| 2,446,011 | A | | 7/1948 | Johnson et al. |
| 2,490,086 | A | | 12/1949 | Page |
| 2,635,335 | A | | 4/1953 | James |
| 2,760,265 | A | | 8/1956 | Draenert |
| 3,010,206 | A | | 11/1961 | Curry |
| 3,025,599 | A | | 3/1962 | Sauers et al. |
| 3,421,218 | A | | 1/1969 | Thompson |
| 3,654,700 | A | | 4/1972 | Pawloski |
| 4,173,069 | A | | 11/1979 | Sidenstick |
| 4,682,416 | A | | 7/1987 | Stolfa |
| 5,566,454 | A | | 10/1996 | Eisenbraun |
| 5,566,768 | A | | 10/1996 | Bourke |
| 5,755,293 | A | | 5/1998 | Bourke |
| 5,901,447 | A | | 5/1999 | Dunning |
| 5,992,024 | A | | 11/1999 | Rogers |
| 5,993,303 | A | | 11/1999 | Fladgard |
| 6,145,203 | A | | 11/2000 | Appleman |
| 6,226,875 | B1 | | 5/2001 | Lii |
| D443,806 | S | | 6/2001 | Fladgard |
| 6,308,421 | B1 | | 10/2001 | Wang |
| 6,640,441 | B1 | | 11/2003 | Huang |
| D487,386 | S | | 3/2004 | Clivio |
| D488,695 | S | | 4/2004 | Peterson |
| 6,776,150 | B2 | | 8/2004 | Gaidjiergis |
| 6,820,339 | B2 | | 11/2004 | Albrightson |
| D512,623 | S | | 12/2005 | Huang |
| 7,093,365 | B2 | | 8/2006 | Peterson |
| 7,293,362 | B2 | | 11/2007 | Konen |
| 7,464,473 | B2 | | 12/2008 | Fladgard |
| 8,453,546 | B2 | | 6/2013 | Ross |
| 8,919,787 | B1 | | 12/2014 | Wilcher |
| D730,141 | S | | 5/2015 | Moss |
| 9,231,386 | B2 | | 1/2016 | Kochi |
| 9,409,813 | B2 | | 8/2016 | Vangura |
| 9,434,013 | B2 | | 9/2016 | Johnson |
| 9,604,383 | B1 | | 3/2017 | Wilcher |
| 9,649,702 | B2 | | 5/2017 | Batho |
| 9,701,032 | B2 | | 7/2017 | Moss |
| 9,764,486 | B2 | | 9/2017 | Bublitz |
| 10,882,122 | B2 | | 1/2021 | Perkins |
| 11,052,474 | B2 | | 7/2021 | Kargenian |
| 11,278,973 | B2 | | 3/2022 | Cutler |
| 12,076,801 | B2 | * | 9/2024 | Gilchrest .................. B25F 3/00 |
| 2004/0118257 | A1 | | 6/2004 | Kratzmaier |
| 2006/0112566 | A1 | | 6/2006 | Peterson |
| 2011/0258859 | A1 | | 10/2011 | Schofield |
| 2011/0314680 | A1 | | 12/2011 | Zhang |
| 2012/0102763 | A1 | | 5/2012 | Rozumovich |
| 2014/0157522 | A1 | | 6/2014 | Lorini |
| 2016/0023289 | A1 | | 1/2016 | Moss et al. |
| 2016/0271781 | A1 | | 9/2016 | Kobayashi |
| 2017/0361475 | A1 | | 12/2017 | Bublitz |
| 2020/0086514 | A1 | | 3/2020 | Hsieh |
| 2020/0198116 | A1 | | 6/2020 | Skrobot |
| 2022/0331942 | A1 | | 10/2022 | Lourenco |
| 2023/0092451 | A1 | | 3/2023 | Cutler |
| 2025/0135561 | A1 | * | 5/2025 | Castanos .............. B23D 29/005 |
| 2025/0289051 | A1 | * | 9/2025 | Almaraz ................... B25F 3/00 |

FOREIGN PATENT DOCUMENTS

| | | | | | |
|---|---|---|---|---|---|
| CN | 104039515 | A | | 9/2014 | |
| CN | 105123835 | A | | 12/2015 | |
| CN | 108472821 | A | | 8/2018 | |
| CN | 113613609 | A | * | 11/2021 | ............. B23D 17/04 |
| CN | 113613609 | B | * | 8/2022 | ............. B23D 17/04 |
| WO | WO-2020142634 | A1 | * | 7/2020 | ............. B23D 17/04 |

* cited by examiner 200
202
204
208
212
214
215
216
218
220
222
224
226
242
258
270

TOOL ATTACHMENT FOR CUTTING HEAVY DUTY SUBSTRATE

RELATED APPLICATIONS

This application is a continuation of U.S. application Ser. No. 17/420,245, filed on Jul. 1, 2021, now U.S. Pat. No. 12,076,801, which claims priority to U.S. Provisional Patent Application No. 62/787,415, filed on Jan. 2, 2019.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON A COMPACT DISC

Not applicable.

STATEMENT REGARDING PRIOR DISCLOSURES BY THE INVENTOR OR A JOINT INVENTOR

Not applicable.

BACKGROUND

Field of the Invention

The present invention relates to the field of power tools, and more specifically to power tool attachments for cutting various materials, such as heavy duty substrates.

Brief Discussion of the Prior Art

Power tools having shearing heads or attachments for such power tools designed to cut heavy substrate materials are generally known in the art. U.S. Pat. No. 2,635,335 A to James teaches a cutting attachment having a stabilizer with a curved tongue to attach to a power unit of a power tool to stabilize said attachment during use. U.S. Pat. No. 2,760,265 to Draenert teaches a shearing attachment for a power tool having a brace, wherein the brace connects the attachment to the power tool housing to prevent free rotation of the attachment. U.S. Pat. No. 9,701,032 B2 to Moss et al. teaches a shearing head attachment having a brace connecting the attachment to a base of a power tool to prevent free rotation of the attachment. U.S. Pat. No. 10,131,048 B2 to Gerber et al. teaches a cutting tool attachment having a sleeve that secures the attachment about a power tool head to prevent free rotation of the attachment. These four examples show the general trend in the art to use a structure secured to both the attachment and to the power tool, generally referred to as a bracer or stabilizer, to prevent free rotation of the attachment relative to the power tool in order to lock the attachment in a single position relative to the power tool.

A different known structural approach to securing an attachment to a power tool is to allow free rotation of the attachment and provide further means of controlling or otherwise steering the attachment via a handle. U.S. Des. Pat. No. D488,695 S to Peterson shows a design of a cutting attachment having a handle guided by a user's hand. U.S. Des. Pat. No. 512,623 S to Huang shows another cutting head attachment without a brace and having a handle. Neither of these designs includes a brace or sleeve structure to secure the attachment to a power tool in a single position. Instead, a handle structure is provided so that the user manually controls positioning of the attachment.

Cutting attachments with braces do not provide the flexibility of use that a free-rotating attachment allows, as the attachment and power tool are in a fixed position relative to each other. Such fixed positions can cause odd angles during use that impede full use of the power tool and attachment combination. The freely-rotating attachments provide more flexibility in that a user may position the power tool at different angle relative to the cutting attachment. Such maneuverability is advantageous when working onsite with environmental structures requiring different angles of approach and access. However, none of the discussed art from either structural approach to cutting tool attachments provides the necessary stability to ensure consistent cutting along a straight line without lateral movement or rocking. Further, neither approach allows for the control necessary to cut neatly along curves, such as when holes or indentations in substrate materials, such as backer board, must be cut to allow the board to be placed around pipes or other rounded fixtures.

The present invention addresses these deficiencies in the art by providing a power tool attachment with a pair of fences, a pair of elongated feet members, and a curved cutting blade. A summary of the instant invention is provided herein.

SUMMARY OF INVENTION

In view of the forgoing, it is an object of the present invention to provide an improved cutting tool attachment that provides several advantages over known, prior-art cutting tool attachments. To that end, a preferred embodiment of a cutting tool attachment for use with a power tool is taught, comprising:

- a drive shaft member secured within a housing, a free end of the drive shaft member being a connection end configured to be accepted into and rotated by an end of the power tool, and an opposite end of the drive shaft member operably connected to a cutting member with a blade extending from an end of the cutting member, wherein the cutting member and blade oscillate up and down relative to the rotation of the drive shaft member;
- a handle connected to the attachment;
- a pair of fences, each fence secured on an opposite side of the housing; and
- a pair of elongated feet members, each elongated feet member secured on the opposite side of the housing between the housing and each fence, and wherein a bottom surface of each fence is flush with a bottom surface of each feet member.

In the preferred embodiment, the cutting tool attachment is freely rotatable about the end of the power tool. One or more structures are needed to stabilize the cutting tool attachment while in use. Instead of using a brace, as exemplified in the prior art, a pair of fences provides a complementary flat surface area for cutting tool attachment to rest against a surface of the material to be cut. The fence therefore prevents free rotation of the cutting tool attachment while in use. The handle allows a user to guide the attachment along the surface of the material, while also providing a user with leverage to keep the attachment against the material surface close to the attachment, but at a safe position to reduce the chance of injury. While the cutting tool attachment is prevented from freely rotating relative to the power tool while in use against the substrate surface, a user is free to rotate the power tool relative to the cutting attachment to achieve a comfortable position or to help turn the attachment and power tool. The power tool is therefore positionable along a 360° arc of movement relative to the attachment while the attachment is positioned along the substrate surface.

In another embodiment of the cutting tool attachment similar to the preferred embodiment, the handle is further attached to a circular collar rotatable about attachment. This allows the handle to be repositioned as necessary for a particular application or as found comfortable by the user.

A further embodiment of the cutting tool attachment includes a blade with a concave cutting edge. Such a concave cutting edge, along with the handle, fence, and positionable power tool, allows the cutting tool attachment to cleanly and smoothly cut in curves and rounded trajectories, such as for pipe openings.

A better understanding of the present invention can be had in view of the following drawing figures.

BRIEF DESCRIPTION OF THE DRAWINGS

The present invention is shown and described in the following drawings.

A further understanding of the present invention may be had through the detailed description of the invention.

DETAILED DESCRIPTION

It will be appreciated that numerous specific details have been provided for a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered so that it may limit the scope of the embodiments described herein in any way, but rather as merely describing the implementation of the various embodiments described herein.

The description that follows, and the embodiments described therein, are provided by way of illustration of an example, or examples, of particular embodiments of the principles of the present invention. These examples are provided for the purposes of explanation, and not limitation, of those principles and of the invention.

Figure 1:
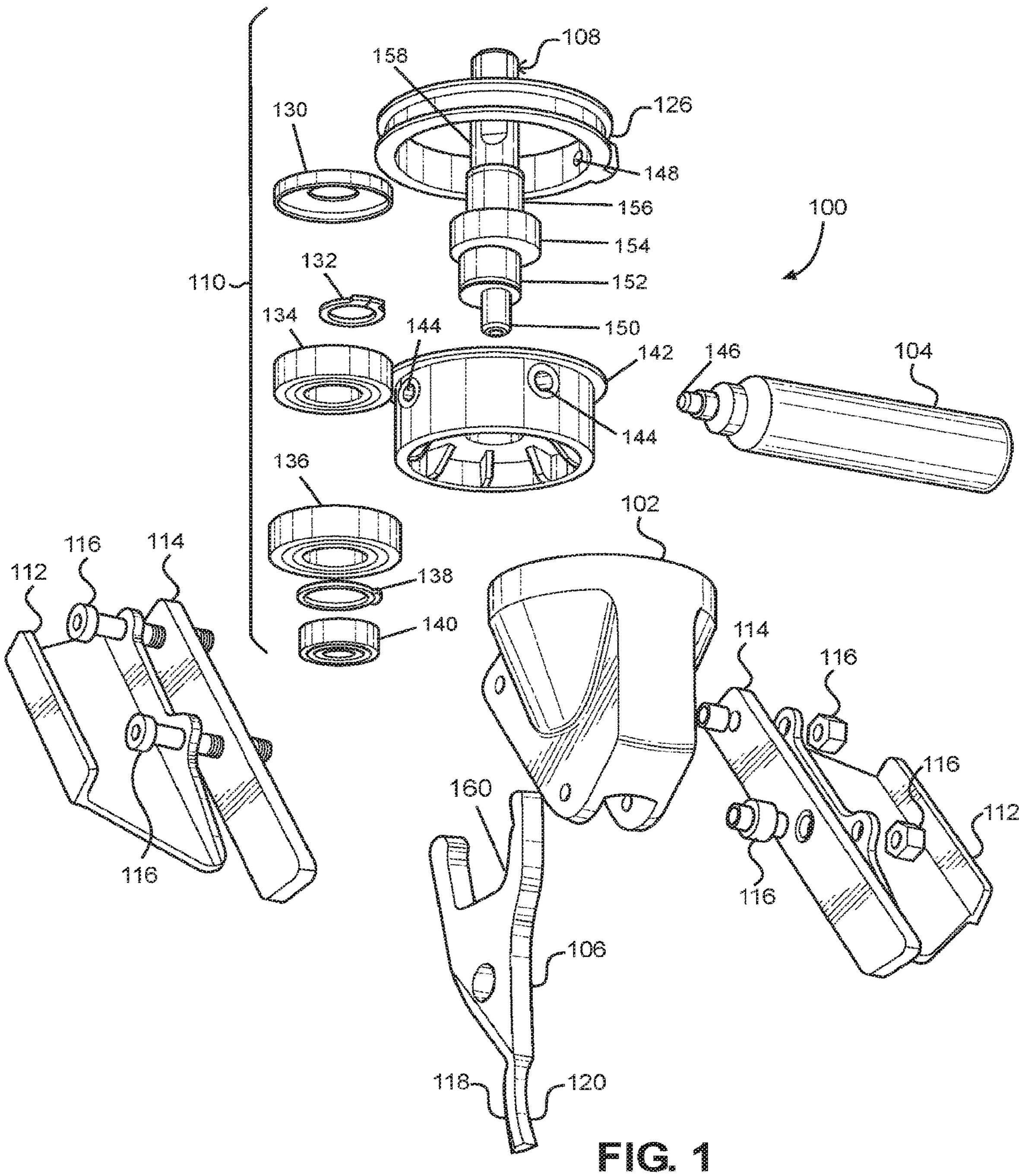
FIG. 1 illustrates an exploded perspective view of a preferred embodiment of a cutting tool attachment for a power tool.

FIG. 1 shows an exploded view of components of a preferred embodiment of a cutting tool attachment 100, including a housing 102, a handle 104, a cutting member 106 having a blade 118 with a cutting edge 120, a drive shaft member 108 which forms a part of the drive mechanism 110, a pair of fences 112, a pair of elongated foot members 114, various fasteners 116, and a collar 126.

The drive mechanism 110 includes various components to allow the cutting tool attachment 100 to be secured to a power tool PT and to oscillate the cutting member 118 via rotation provided by the power tool. The drive shaft member 108 slots into and is secured by a power tool PT along a connection end 158. A remaining length of the drive shaft member 108 includes various lands 150, 152, 154, and 156 of differing diameters and lengths. Lands 150, 154, 156 are coaxial with the connection end 158. Land 152 is not coaxial with lands 150, 154, 156 and the connection end 158.

Three rings 134, 136, and 140 fit over lands 156, 152, and 150, respectively. The three rings may have varying diameters 134, 136, and 140. However, ring 140 has a small diameter than ring 136 such that the diameters of rings 140 and 136 may fit within a groove 160 in the cutting member. Ring 134 slides over and connects to land 156 via the connection end 158 of the drive member shaft 108 through a cylindrical opening through a center of the ring 134. Ring 134 is further secured to land 156 via a circular clamp 132, or similar fastener, secured around a free end of land 156. Ring 136 slides over and connects to land 152 via land 150 through a cylindrical opening through a center of the ring 136. Ring 136 is further secured to land 152 via a circular clamp 138, or similar fastener, secured around a free end of land 152. Ring 140 slides over and connects to land 150 through a cylindrical opening through a center of the ring 140. When the attachment 100 is fully assembled, an inner surface of the cutting member groove 160 helps to further ensure ring 140 remains attached around land 150. Land 154, when the attachment is fully assembled, separates ring 134 from ring 136 inside the housing 102.

Spacer 130 is secured over ring 134 and around the drive shaft member 108 through a circular opening in the middle of the spacer, such that the spacer rests between the ring 134 and cap 142 when the attachment 100 is fully assembled. The spacer 130, along with ring 134 and land 154, prevents the drive shaft member 108, and attached elements, from moving longitudinally relative to the housing 102.

The cap 142 is cylindrical in shape with a diameter to securely fit within the housing 102. The length of the cap 142 is such that a cylindrical collar 126 fits around the outer surface and along a circumference of the cap, while also securely extending within the housing 102. A plurality of circular openings 144 extend into the outer surface of the cap 142. Each opening 144 is sized to correspond with a fastening member 146 of the handle 104, which extends through an opening 148 in the collar 126. The drive shaft member 108 extends through and partially past the cap 142, in a direction away from the housing 102, such that the connection end 158 extends freely from the attachment 100 for connection with the power tool PT.

In operation, and when the attachment 100 is operably connected to the power tool PT, the power tool rotates the drive shaft member 108. Both lands 150 and 152, along with rings 140 and 136, are positioned within groove 160 of the cutting member 106. Because land 152 is not coaxial with land 150, ring 136 continuously contacts a top of the groove 160 and then a bottom of the groove back and forth, causing the cutting member 106 to oscillate up and down at speeds dependent on the angular velocity of the drive shaft member 108. A pivot member in the housing secures the cutting member 106 within the housing 102 and permits the cutting member to pivot relative to the housing. A blade 118 projects from an end of the cutting member. A cutting edge 120 along an upper surface of the blade 118 cuts substrates and material in use as the cutting member 106 oscillates. One skilled in the art would appreciate that the drive mechanism 110 described herein may have structural differences that achieve the same effect, namely to rotate the drive shaft member 108 via the power tool PT to oscillate the cutting member 106 up and down.

The housing 102 has a hollow interior allowing the housing to fit over the drive mechanism 110, including the drive shaft member 108, and the cutting member 106. The housing 102 includes a circular opening corresponding to the diameter of the cap 142, such that at least a partial length of the cap securely fits within the circular opening. An elongated opening in the housing allows a partial length of the cutting member 106, including the blade 118 and cutting edge 120, to extend beyond the housing.

A pair of fences 112 and elongated foot members 114 attach to the housing 102, with a fence and an elongated foot member of each pair attached to either side of the housing. Each fence 112 is attached to the housing 102 with the elongated foot member 114 between the fence and the housing. A channel for the cutting member 106 and blade 118 oscillation is formed between the pair of elongated foot members 114 and through the elongated opening in the housing 102. The blade 118 extends beyond the housing 102 at a downward angle relative to a bottom surface of the fences 112 while in use and past the housing in a forward direction. The pair of elongated foot members 114 provides a counter-acting force downwardly and perpendicularly to a surface of a substrate material in opposition to an upward force of the oscillating blade 118 to help create a clean cut. The pair of fences 112 provide a large, flat surface area along a bottom surface 122 parallel to a substrate surface in use to provide stability, and ensure a 90° angle between the substrate surface and a central vertical plane bisecting the attachment along its length. In this embodiment, each fence includes a side wall extend upwardly and along the length of fence along opposite lateral sides. One side wall provides connection points, in this case openings, for fasteners 116 to secure the fence 112 to the elongated foot member 114 and housing 102, while the other side wall can be used as a guide. The pair of fences 112 may be shaped differently and attached to the elongated foot member 114 and housing 102 differently, as long as the fence 112 provides lateral stability to the attachment during operation.

A pair of fasteners 116 secures the pair of fences 112, elongated foot members 114, and housing 102 together. In the instant embodiment, a pair of nut and bolt fasteners with corresponding spacers are shown. However, other known, appropriate fasteners may be used instead. This includes non-removable fastenings, such as welded joints and the like. Further, it is contemplated that the fence 112 and elongated foot members 114 may be formed from one or more of the same piece of material, which itself may be removable from the housing 102. Further, the fence 112 and elongated foot members 114 may be formed from the same material as the housing 102, such that fasteners 116 are not required to secure the fence and elongated foot members to the housing.

The handle 104 is attached to the housing 102 via a collar 126, which forms a ring around an exterior circumference of the cap 142. The collar 126 is coaxially rotatable about the circumference of the cap 142, and secured between the cap and the housing 102. In this embodiment, the plurality of openings 144 in the cap 142 includes three spaced openings along a 180° arc, positioned at 0°, 90°, and 180°, into which the fastening member 146 of the handle 104 may be inserted. The handle 104 is therefore adjustable about the housing 102 in a more or less 180° arc about the top of the attachment 100. The plurality of openings 144 may include further openings which allow the handle 104 to be adjustable about the housing 102 in a 360° arc, or fewer openings further limiting adjustability of the handle.

As no brace is provided between the attachment 100 and the power tool PT, the attachment is able freely rotate relative to the power tool PT via the connection end 158 of the drive shaft member 108 about a center line running through the length of the drive shaft member. To prevent free rotation of the attachment 100 during operation, but to also allow the power tool PT to be positioned at different angles relative to a central vertical plane bisecting the power tool along its length and to the central vertical plane bisecting the attachment along its length, the pair of fences 112 and handle 104 are provided to ensure proper stability. The pair of fences 112 prevent lateral movement, or rocking, of the attachment 100, while the handle 104 provides leverage to easily keep the attachment on the substrate surface. Further, the curved cutting edge 120 allows the cutting tool attachment 100 to easily and cleanly cut rounded shapes. Such a feature is not provided by known cutting and shearing tools and attachments.

FIGS. 2A-2E provide further views of the cutting tool attachment 100, as assembled. Elements of the drive mechanism 110 fit within the housing 102 between inner surfaces of the housing and the cap 142. The connection surface 158 of the drive shaft member 108 extends through and beyond the cap 142 to allow connection of the attachment 100 to the power tool PT. Each fence 112 and elongated foot member 114 is attached to an opposite side of the housing 102 via fasteners 116. The cutting member 106 is secured within the housing such that the blade 118 extends outwardly and slightly downwardly from the housing.

Figure 2C:
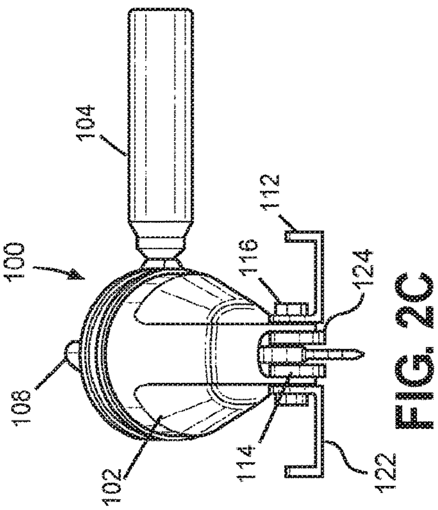
FIG. 2C illustrates a front view of the preferred embodiment of FIG. 1.
Figure 2E:
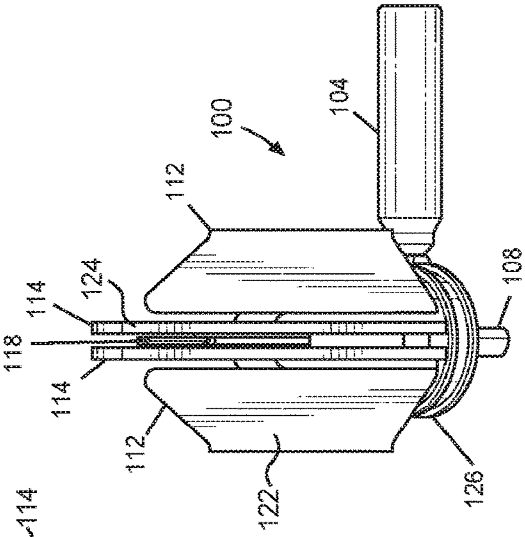
FIG. 2E illustrates a bottom view of the preferred embodiment of FIG. 1.
Figure 2B:
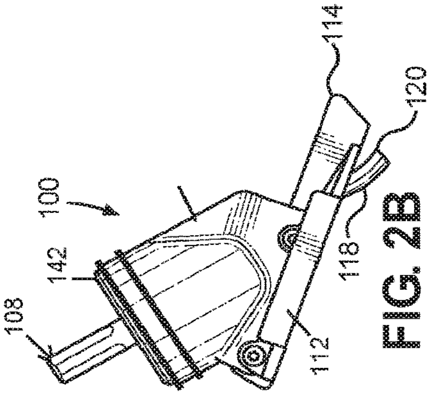
FIG. 2B illustrates a right side view of the preferred embodiment of FIG. 1.
Figure 2A:
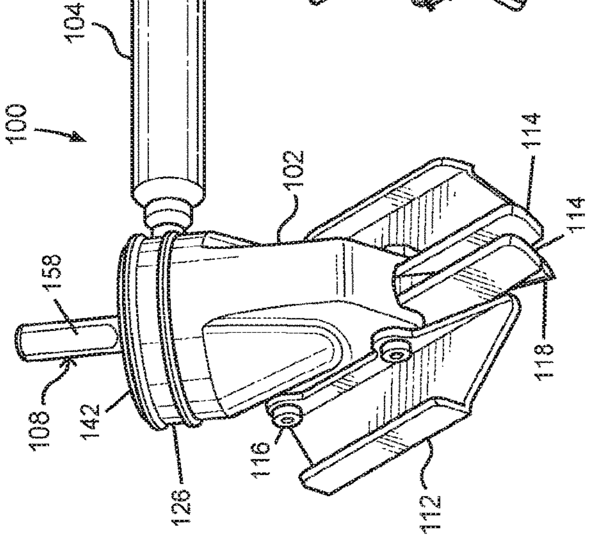
FIG. 2A illustrates a right perspective view of the preferred embodiment of FIG. 1.
Figure 2D:
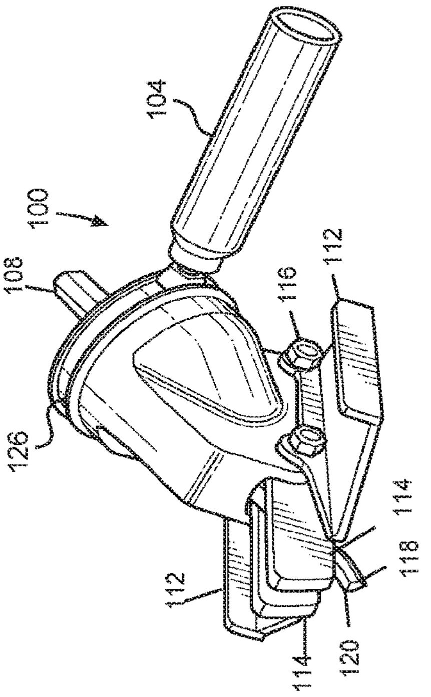
FIG. 2D illustrates a left perspective view of the preferred embodiment of FIG. 1.

The handle 104 is attached to the collar 126, which is positioned around the cap 142 and between the cap and the housing 102. The collar 126 may be positioned over the housing 102 and/or cap 142 in other embodiments. Further, the collar may be fixed or movable between two or more positions, such the handle is either fixed or movable between two or more positions, respectively. Having the handle 104 on the attachment 100 is necessary to provide proper guidance and leverage during operation of the attachment once attached to the power tool PT. As seen in FIGS. 2C and 2E, the bottom surface 122 of the pair of fences 112 provides a large surface area for stabilizing the attachment 100 on a substrate surface, as opposed to the prior art references discussed. A specific surface area value is not required, so long as the bottom surface 122 of the fences 112 adequately offers proper lateral support to prevent rocking of the attachment 100 in use. Further, the bottom surface 122 of the pair of fences 112 is flush with a bottom surface 124 of the pair of elongated foot members 114 to prevent rocking or lateral movement of the attachment 100 on a substrate surface. Flush surfaces 122 and 124 also ensure that the substrate is properly cut during operation.

Figure 3:
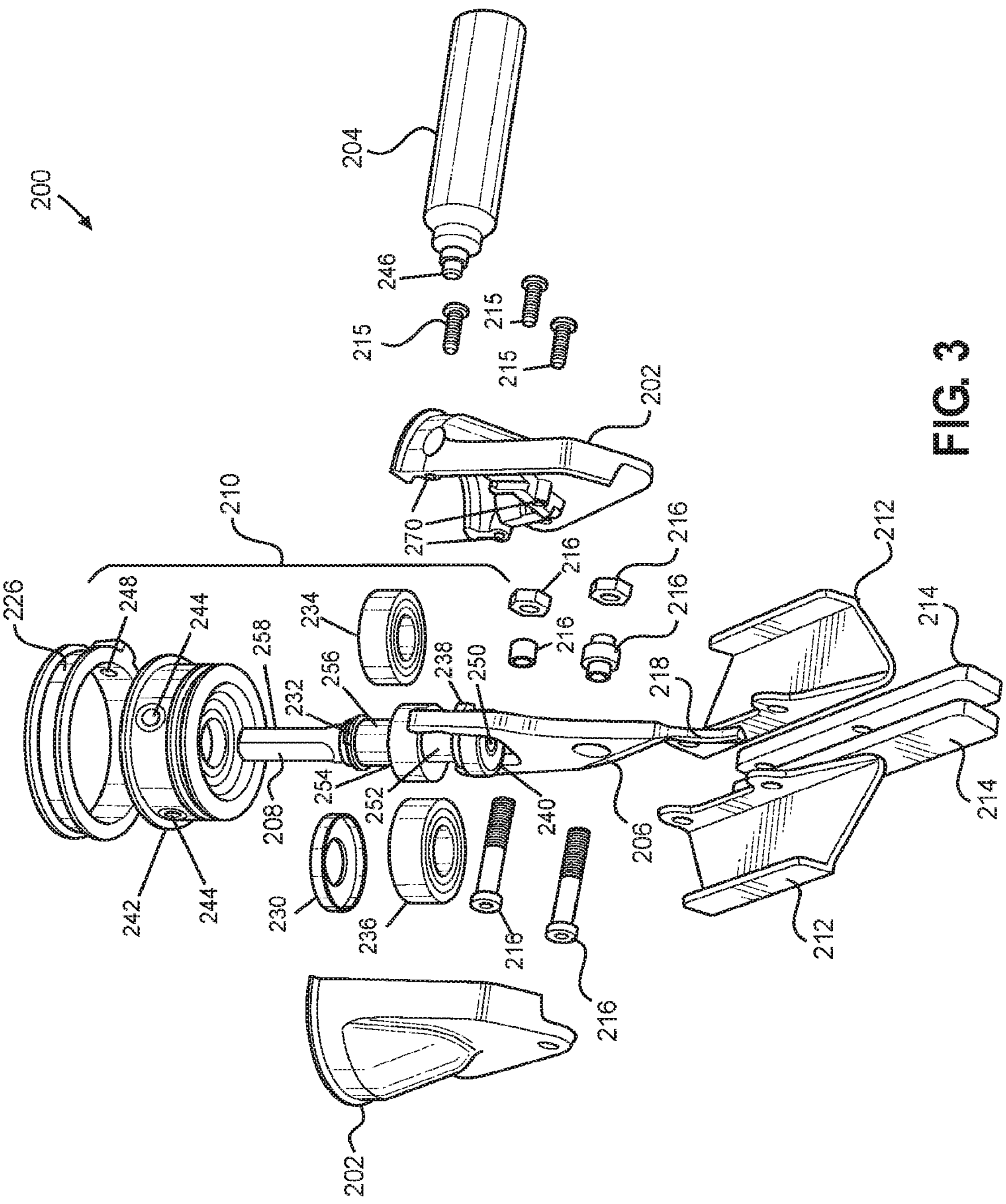
FIG. 3 illustrates an exploded perspective view of another embodiment of the cutting tool attachment for a power tool.
Figures 4A, 4B, 4C, 4D, 4E:
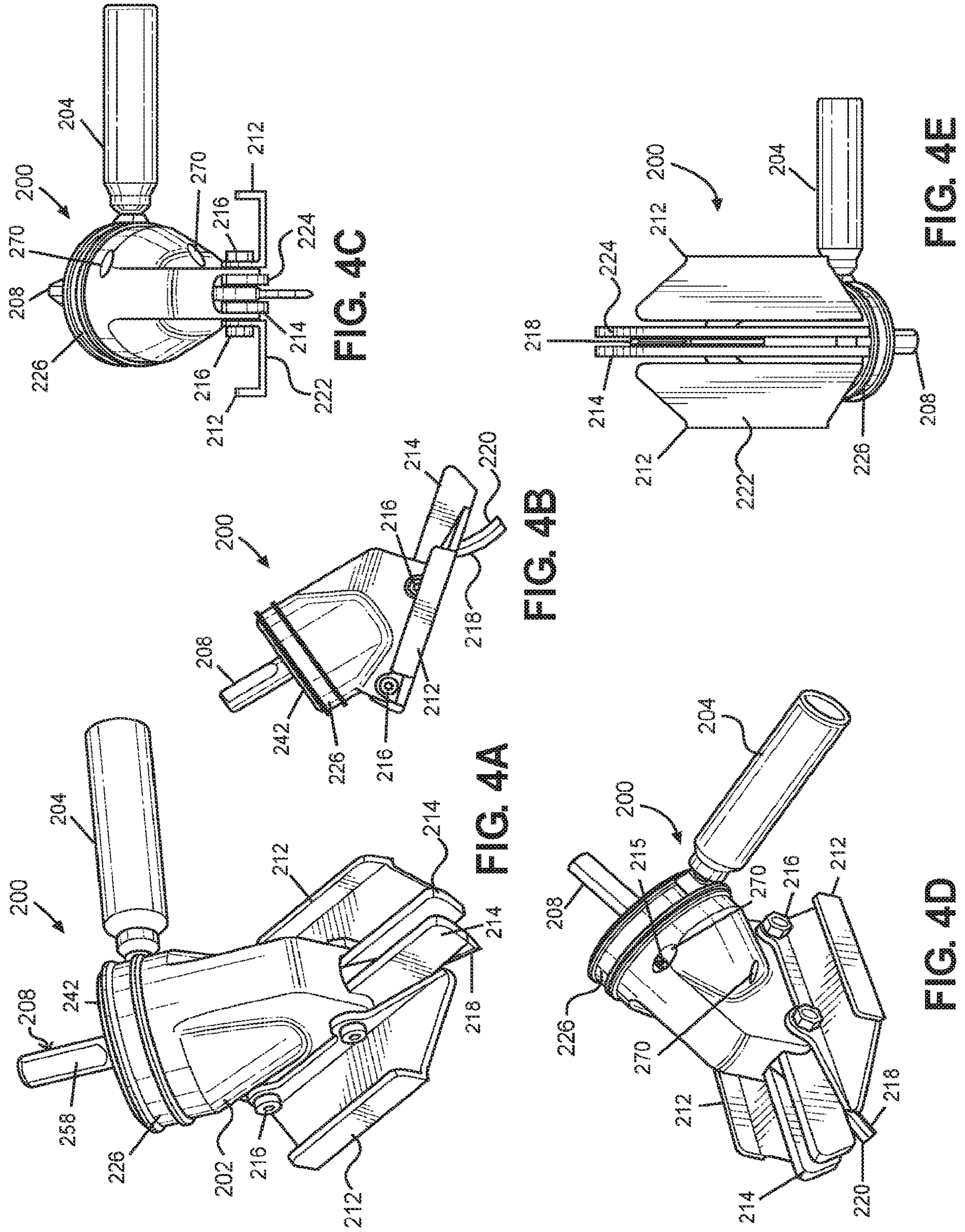
FIG. 4A illustrates a right perspective view of the preferred embodiment of FIG. 3.
FIG. 4B illustrates a right side view of the preferred embodiment of FIG. 3.
FIG. 4C illustrates a front view of the preferred embodiment of FIG. 3.
FIG. 4D illustrates a left perspective view of the preferred embodiment of FIG. 3.
FIG. 4E illustrates a bottom view of the preferred embodiment of FIG. 3.

Another embodiment of a cutting tool attachment 200 is shown in FIG. 3 with similar elements as the preferred embodiment 100, including a housing 202, a cap 242, a collar 226, a handle 204, a cutting member 206 having a blade 218 with a cutting edge 220, a drive shaft member 208 which forms a part of the drive mechanism 210, a pair of fences 212, a pair of elongated foot members 214, various fasteners 216, and a collar 226.

The drive mechanism 210 similarly includes the drive shaft member 208 having lands 250, 252, 254, and 256 and a connection surface 258. Rings 234, 236, and 240 similarly correspond to lands 256, 252, and 250, respectively. Clamps 232 and 238 secure rings 234 and 240 onto lands 256 and 250, respectively. Spacer 230 fits between the cap 242 and spacer 232 along the length of the drive shaft member 208.

The cap 242 has a plurality of openings 244 shaped to accommodate a fastening member 246 of the handle 204 extending through an opening 248 in the collar 226. The collar 226 is rotatably secured around a circumference of the cap 242 and between the cap 242 and housing 202 once the attachment 100 is assembled. The positioning of the handle 204 relative to the housing 202 may changeable via removably securing the handle into various openings 244 in the cap 242 via rotation of the collar 226. The handle 204 is preferably removably secured to both the cap 242 and the collar 226, such that the handle may be attached and detached from the cap while remaining attached to the collar.

The pair of fences 212 and elongated foot members 214 are similarly shaped and attached to the housing 202 via fasteners 216, just as they are in the previously described attachment 100.

This embodiment of the attachment 200 shares all features and benefits of the preferred embodiment, including the bottom surfaces 222 and 224 of the pair of fences and pair of elongated foot members, respectively, except that the housing 202 is shaped as two separate pieces secured together by a plurality of fasteners 215 secured through openings 270.

Having the housing 202 shaped as two pieces secured together by fasteners 215 provides advantages in manufacturing and assembly of the attachment 200.

FIGS. 4A-4E provide further views of the assembled cutting tool attachment embodiment 200, as fully assembled. The shape, structure, and function of this embodiment is nearly identical to the preferred embodiment 100, as shown in FIGS. 1-2E, except for openings 270 in the housing 102 and corresponding fasteners 215 inserted therein to secure the two halves of the housing together.

Figures 5A, 5B, 5C, 5D:
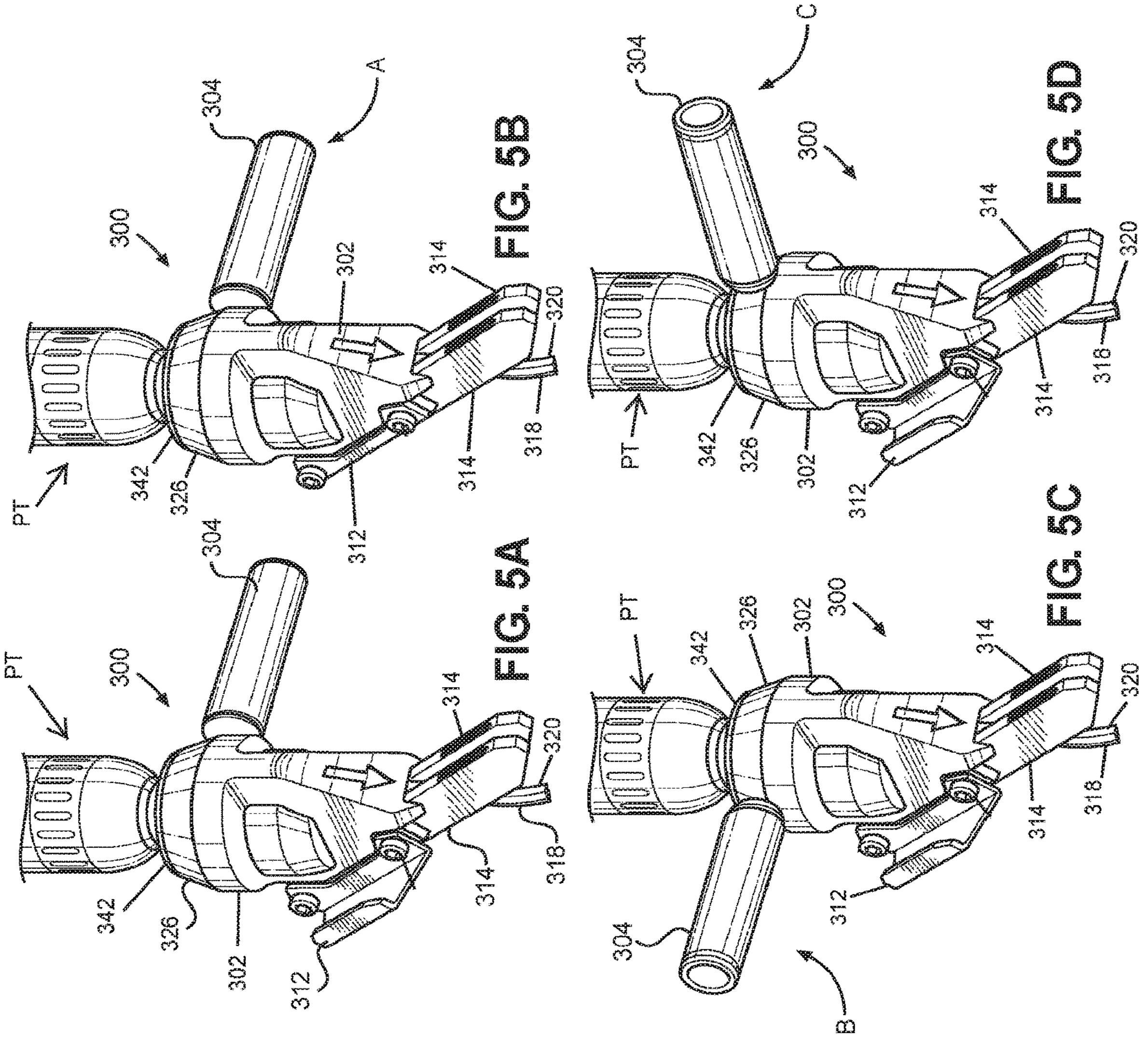
FIG. 5A illustrates a right perspective view of another embodiment of the cutting tool attachment for a power tool attached to said power tool.
FIG. 5B illustrates a right perspective view of the embodiment of FIG. 5A with a handle in a left-side position, and with an alternative embodiment of fence installed via fasteners.
FIG. 5C illustrates a right perspective view of the embodiment of FIG. 5A with the handle in a right-side position.
FIG. 5D illustrates a right perspective view of the embodiment of FIG. 5A with a handle in a top-side position.

FIGS. 5A-5D provide views of a further embodiment of a cutting tool attachment 300, similar to embodiments 100 and 200 and with similar elements and functions. In FIG. 5A, the shape of the housing 302 is slightly different than the attachment 100 and 200 embodiments. The shape of the housing 302 may be further changed in detail as long as the remaining elements of the attachment 300 remain similar enough in structure to retain the function described herein. The pair of fences 312 and elongated foot members 314 are also slightly different in shape in attachment 300. The fence 312 is shorter and narrower, compared to fence 112 and 212. However, the fence 312 still provides lateral stability to prevent rocking. The elongated foot members 314 are slightly longer and wider in attachment 300, as shown in FIG. 5A. Further, a free end of each elongated foot member 314 is more angular than a curved free end of elongated foot members 114 and 214. Again, such changes in shape do not hinder or prevent the function of these elements as described herein and are therefore permissible.

The blade 318 and cutting edge 320 are preferably curved to allow for cleaner cuts along non-liner patterns. However, it is conceivable for the blade 318 and cutting edge 320 to be linear or non-curved.

FIG. 5B illustrates an even narrower pair of fences 312. In this embodiment, the fence 312 does not create a channel between two side walls, but instead utilizes essentially one side wall with increased lateral thickness to provide adequate lateral support. While significantly narrower than the fence 312 of the attachment 300 shown in FIG. 5A, the fence of FIG. 5B is conceivable in applications requiring a narrower footprint, such as between two or more pipes, multiple fixtures, etc.

FIGS. 5B-5D further depict three different positions, denoted as positions A, B, and C, of the handle 304 relative to the housing 302. The collar 326 rotates coaxially about the cap 342 and is secured between the cap and the housing 302. The handle 304, being attached to the collar 326, rotates with the collar between at least positions A, B, and C. These positions are three possible positions that the handle can be secured to along the housing, but do not limit the positioning to only positions A, B, or C.

Figure 6B:
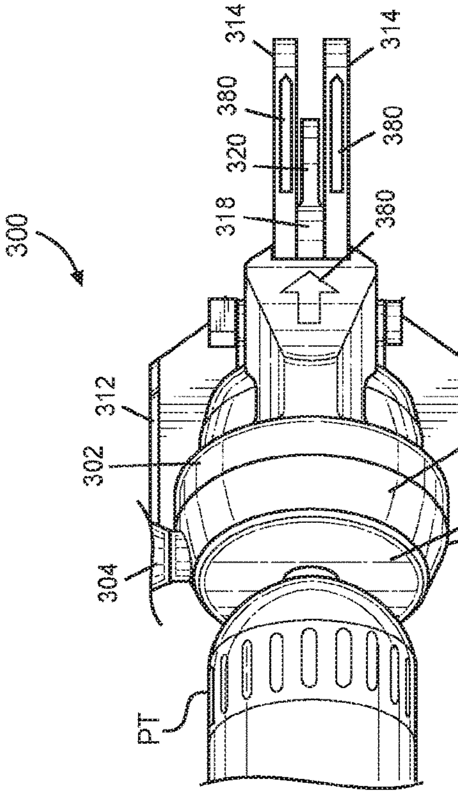
FIG. 6B illustrates a top view of the embodiment of FIG. 6B.
Figure 6C:
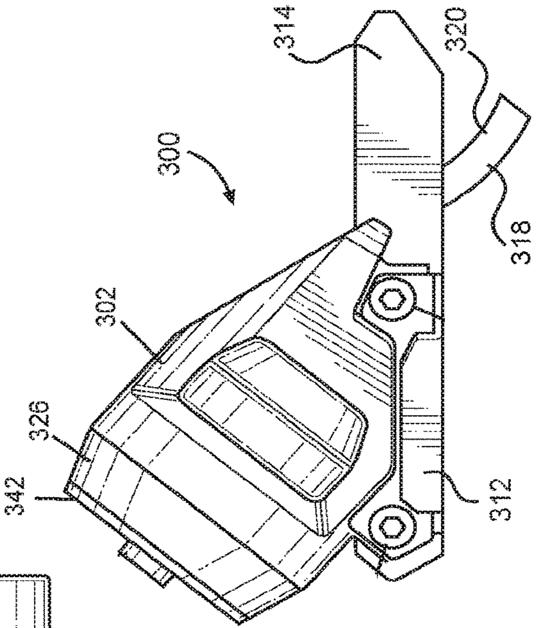
FIG. 6C illustrates a right side view of the embodiment of FIG. 6C.
Figure 6A:
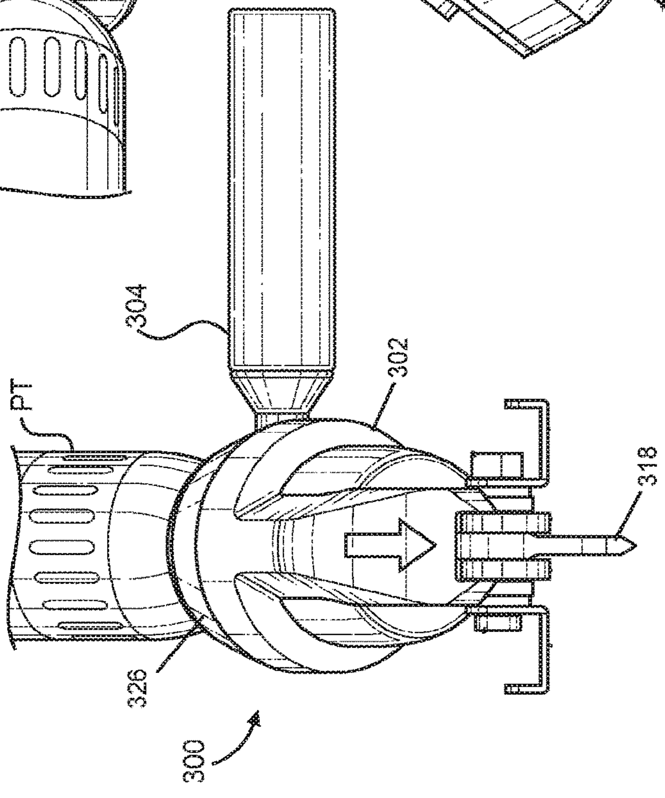
FIG. 6A illustrates a front view of the embodiment of FIG. 5A.

FIGS. 6A-6C show further views of the cutting tool attachment 300, as shown in FIGS. 5A, 5B and 5C, and provide better views for the design variations relative to embodiments 100 and 200. FIG. 6B provides a view of markers 380 that are placed on the housing 302 and the elongated foot members 314 that help direct and guide users along a cut line. As the blade 318 and cutting edge 320 is situated below the substrate, or at least not easily visible, when commencing operation of the power tool PT and attachment 300, the markers 380 help orient a user and denote where the blade will be cutting. Together with markings on the substrate, the markers 380 provide additional information to the user to ensure accurate cuts in the substrate.

Figure 7A:
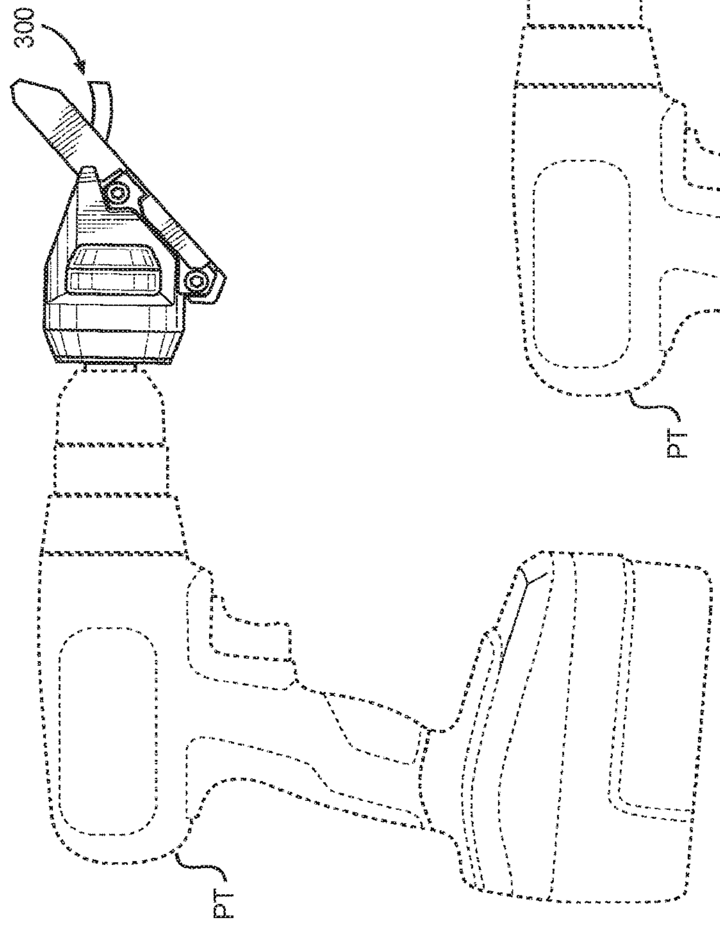
FIG. 7A illustrates a side view of the attachment of the embodiment of FIG. 5A to a power tool.
Figure 7B:
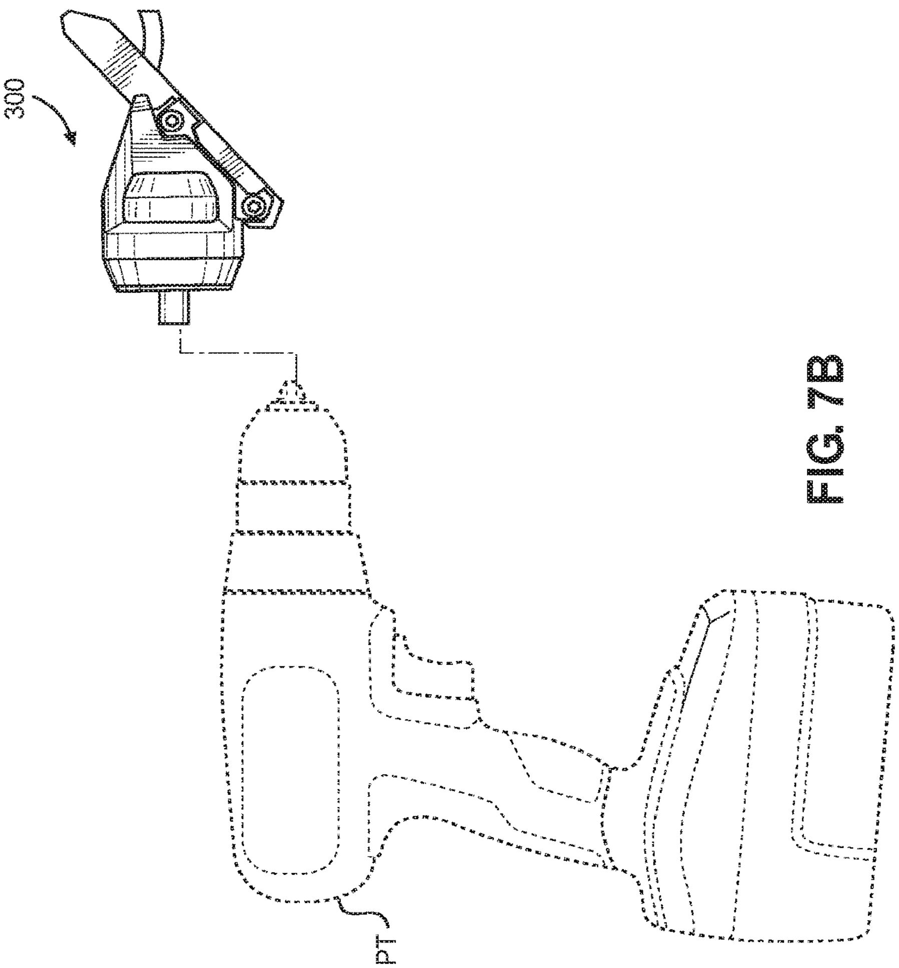
FIG. 7B illustrates a side view of the removal of the embodiment of FIG. 5A from the power tool.

Finally, FIGS. 7A-7B provide an exemplary attachment and removal of the cutting tool attachment to a power tool PT. The representative power tool is shown for demonstration purposes only, and other power tool types, shapes, and sizes may be used in connection with the embodiments 100, 200, and/or 300. Further all embodiments 100, 200, and 300 attach in a similar manner to a power tool PT, and cutting tool attachment 300 is shown without intending to limit the teaching to only that embodiment. The handle 304 is provided on an opposite side of the attachment 300 from the views shown in FIG. 7A-7B to provide an unobstructed view of the attachment 300.

What is claimed is:

1. A cutting tool attachment for use with a power tool, the cutting tool attachment comprising:
- a housing;
- a cutting member having a blade extending from an end of the cutting member;
- a drive shaft member secured within the housing, a free end of the drive shaft member being a connection end configured to be accepted into and rotated by an end of the power tool, and an opposite end of the drive shaft member operably connected to the cutting member;
- a pair of fences, each fence secured on an opposite outer side of the housing; and
- a pair of elongated feet members, each elongated feet member secured on an opposite inner side of the housing, wherein the housing is between a corresponding fence of the pair of fences and a corresponding elongated foot member of the pair of elongated feet members.

2. The cutting tool attachment according to claim 1, wherein a bottom surface of each fence is flush with a bottom surface of each of elongated feet member.

3. The cutting tool attachment according to claim 1, wherein the cutting member and blade oscillate up and down relative to the rotation of the drive shaft member.

4. The cutting tool attachment according to claim 1, further comprising a handle connected to the housing.

5. The cutting tool attachment according to claim 4, further comprising a cap secured within the housing, the drive shaft member extending through the cap, and a collar rotatable about the cap and secured between the cap and the housing, wherein the handle is attached to the collar such that the handle is repositionable on the collar.

6. The cutting tool attachment according to claim 1, wherein a cutting edge of the blade is curved.

7. The cutting tool attachment according to claim 6, wherein the curved cutting edge is concave.

8. The cutting tool attachment according to claim 1, wherein each of the pair of fences includes a base and a pair of side walls extending upwardly from opposite lateral sides of the base, wherein one of the side walls in the pair of side walls is secured to a respective one of the outer sides of the housing.

9. The cutting tool attachment according to claim 1, wherein the cutting member includes a groove disposed in the housing.

10. The cutting tool attachment according to claim 9, further comprising a plurality of rings surrounding the drive shaft member, wherein at least one of the rings is received within the groove of the cutting member to define the operable connection between the drive shaft member and the cutting member.

11. A cutting tool attachment for use with a power tool, the cutting tool attachment comprising:
- a housing having a first leg with an inner side and an outer side and a second leg with an inner and outer side;
- a cutting member having a blade extending from an end of the cutting member;
- a drive shaft member secured within the housing, the drive shaft member having a first end being a free end configured to be accepted into and rotated by an end of the power tool and a second end operably connected to the cutting member;
- a first fence secured to the outer side of the first leg of the housing;
- a second fence secured to the outer side of the second leg of the housing;
- a first elongated foot member secured to the inner side of the first leg of the housing; and
- a second elongated foot member secured to the inner side of the second leg of the housing.

12. The cutting tool according to claim 11, wherein the first fence includes a first base and a first pair of side walls extending upwardly from opposite lateral sides of the first base, wherein one of the side walls in the first pair of side walls is secured to the outer side of the first leg of the housing, and the second fence includes a second base and a second pair of side walls extending upwardly from opposite lateral sides of the second base, wherein one of the side walls in the second pair of side walls is secured to the outer side of the second leg of the housing.

13. The cutting tool attachment according to claim 11, wherein the cutting member and blade are configured to oscillate up and down relative to rotation of the drive shaft member.

14. The cutting tool according to claim 11, wherein the first leg, the first fence, and the first elongated foot member each have a pair of spaced openings that are aligned with one another to receive a respective fastener to secure the first fence and the first elongated foot member to the first leg of the housing.

15. The cutting tool according to claim 14, wherein the second leg, the second fence, and the second elongated foot member each have a pair of spaced openings that are aligned with one another and with a respective one of the pair of spaced openings of the first leg, the first fence, and the first elongated foot member to receive one of the respective fasteners to secure the second fence and the second elongated foot member to the second leg of the housing.

16. The cutting tool attachment of claim 11, wherein a cutting edge of the blade is curved.

17. The cutting tool according to claim 11, wherein the cutting member includes a groove disposed in the housing.

18. The cutting tool according to claim 17, further comprising a plurality of rings surrounding the drive shaft member, wherein at least one of the rings is received within the groove of the cutting member to define the operable connection between the drive shaft member and the cutting member.

19. The cutting tool attachment according to claim 11, further comprising one or more alignment markers on at least one of the first elongated foot member or the second elongated foot member, wherein the one or more alignment markers is configured to indicate a cutting path of the blade.

20. A cutting tool attachment for use with a power tool, the cutting tool attachment comprising:
- a housing having a first leg with an inner side and an outer side and a second leg with an inner and outer side;
- a cutting member having a blade extending from an end of the cutting member;
- a drive shaft member secured within the housing, the drive shaft member having a first end being a free end configured to be accepted into and rotated by an end of the power tool and a second end operably connected to the cutting member;

a first fence secured to the outer side of the first leg of the housing, the first fence having a first base and a first pair of side walls extending upwardly from opposite lateral sides of the first base, wherein one of the side walls in the first pair of side walls is secured to the outer side of the first leg of the housing;

a second fence secured to the outer side of the second leg of the housing, the second fence having a second base and a second pair of side walls extending upwardly from opposite lateral sides of the second base, wherein one of the side walls in the second pair of side walls is secured to the outer side of the second leg of the housing;

a first elongated foot member secured to the inner side of the first leg of the housing; and a second elongated foot member secured to the inner side of the second leg of the housing, wherein the cutting member and blade are configured to oscillate up and down relative to rotation of the drive shaft member.

* * * * *